March 25, 1952     H. W. TREVASKIS     2,590,587
FLUID PRESSURE RELAY FOR BRAKE MECHANISMS
Filed July 7, 1948     3 Sheets-Sheet 1
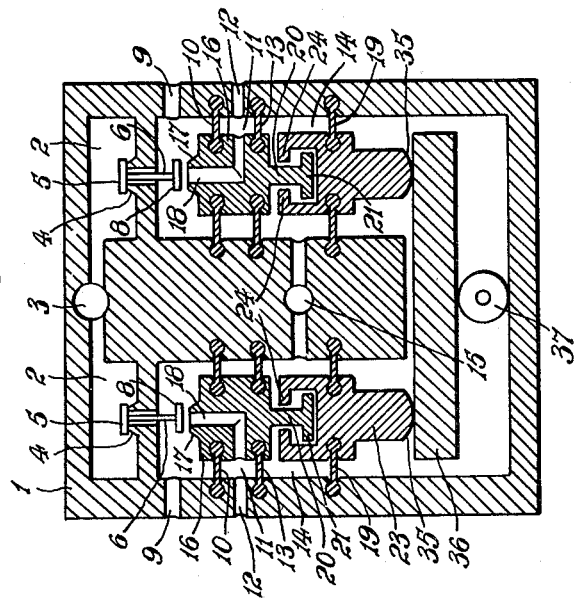
INVENTOR
HENRY WILLIAM TREVASKIS
BY March 25, 1952 H. W. TREVASKIS 2,590,587
FLUID PRESSURE RELAY FOR BRAKE MECHANISMS
Filed July 7, 1948 3 Sheets-Sheet 2
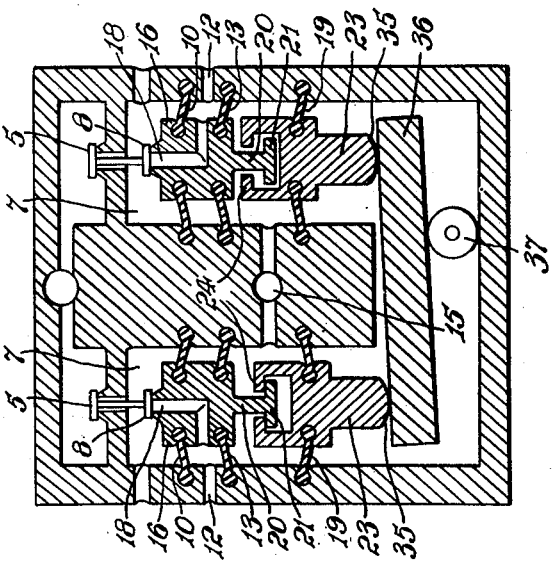
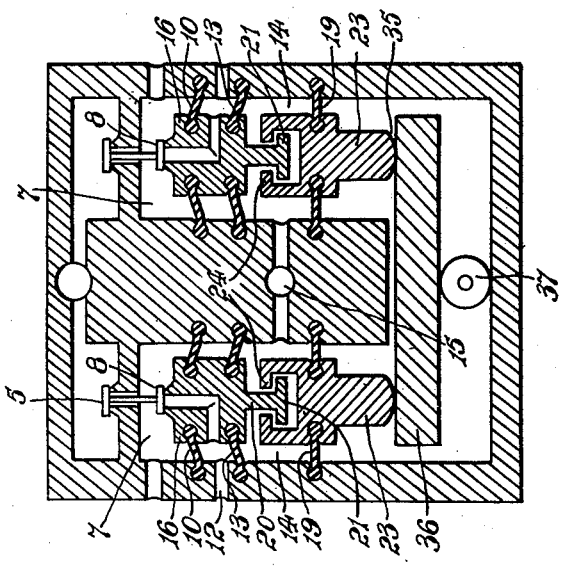
INVENTOR
HENRY WILLIAM TREVASKIS
BY *Benj. T. Rauber*
*his attorney*

March 25, 1952  H. W. TREVASKIS  2,590,587
FLUID PRESSURE RELAY FOR BRAKE MECHANISMS
Filed July 7, 1948  3 Sheets-Sheet 3
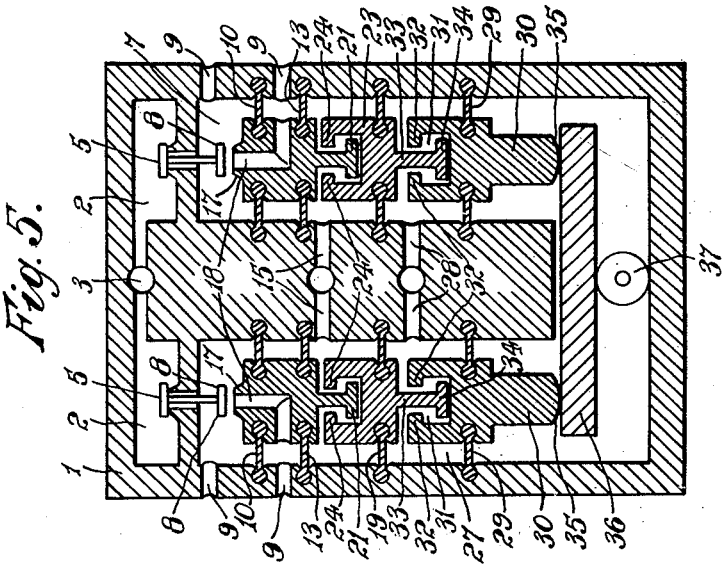
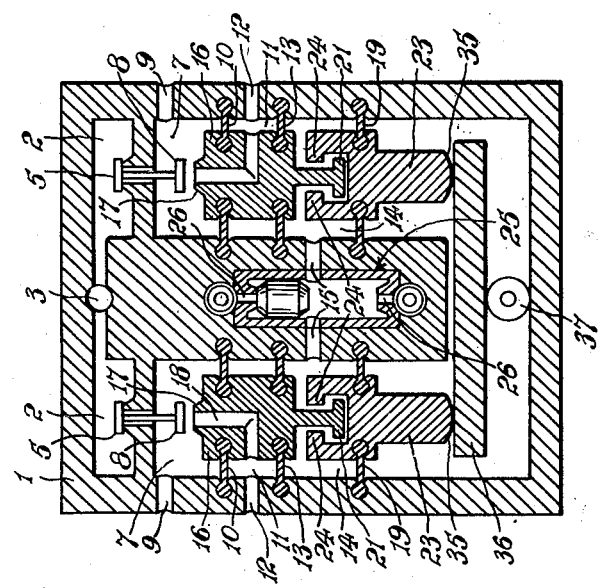
INVENTOR
HENRY WILLIAM TREVASKIS
BY
his attorney Patented Mar. 25, 1952

2,590,587

UNITED STATES PATENT OFFICE 2,590,587

FLUID PRESSURE RELAY FOR BRAKE MECHANISMS

Henry William Trevaskis, Solihull, England, assignor to Dunlop Rubber Company Limited, London County, England, a British company Application July 7, 1948, Serial No. 37,381
In Great Britain July 11, 1947

4 Claims. (Cl. 137—144)

This invention relates to fluid pressure systems adapted to be manually actuated to effect operation of suitable mechanism. More particularly the invention relates to fluid pressure relay devices to be used in fluid pressure system suitable for aircraft or other vehicles to operate brake mechanism.

Brake operating systems for aircraft have previously been proposed in which "Bowden" cable means extend from a manually actuated control device in the cabin to a relay device connected to a source of fluid pressure and the brake mechanism, and in some aircraft the cable is relatively long and furthermore follows a sinuous path.

An object of this invention is to provide a fluid pressure operated relay device which can be actuated by a relatively light manual force.

A further object is to provide such a relay device which is suitable for operation by dual control means.

Another object is to provide such a relay device which is suitable to effect differential braking of vehicle wheels and a further object is to provide such a device which is suitable for operation by dual control means.

According to the invention a fluid pressure relay device for operating the brake mechanisms of aircraft and the like comprises a valve casing having two chambers one chamber being a pressure chamber adapted to be connected to a source of fluid pressure supply and having an opening leading to the second chamber, a displaceable valve control member centrally disposed within the said second chamber having two fluid-tight connections with the inner periphery of the said casing dividing it into an operating section adapted to be connected to a fluid-pressure operated mechanism, an exhaust section adapted to be connected to exhaust, and a control section adapted to be connected to an independently controlled source of fluid pressure supply, the said valve control member having a central opening communicating from the said operating section to the said exhaust section, and an inlet valve movable by the said control member and adapted to close the opening between the said pressure chamber and the said operating section, the said valve being movable with an exhaust valve adapted to close the central opening between the operating section and the exhaust section, the said valve control member being displaceable from a position in which the inlet valve is shut and the exhaust valve fully open to a position in which the inlet valve is fully open and the exhaust valve shut.

The invention will now be more particularly described with reference to the accompanying drawings illustrating several forms of the invention and in which similar references denote corresponding parts throughout the several views.

Figure 1 is a cross-sectional view of a relay device embodying the invention and suitable for operation from a single control device and having two operating sections for connection to two separate brake mechanisms which can be differentially controlled for steering purposes.

Figure 2 is a corresponding view of the relay device shown in Figure 1 but with fluid pressure introduced to supply equal fluid pressure to the two brake mechanisms.

Figure 3 is a corresponding view of the relay device shown in Figure 2 but with the unit operating to supply the two brake mechanisms with differential fluid pressures.

Figure 4 is a cross-sectional view of a relay device suitable for operation from dual control devices and having two operating sections for connection to two separate brake mechanisms which can be differentially controlled for steering purposes.

Figure 5 is a cross-sectional view of another relay device suitable for operation from dual control devices and having two operating sections for connection to two separate brake mechanisms which can be differentially controlled for steering purposes.

It should be appreciated that the relay devices can be connected to a fluid pressure control device of any suitable known construction which can be either hand or foot actuated. One form of control device may comprise apparatus including a master cylinder.

With reference to Figure 1 the relay device comprises an inlet 3 communicating with duplicate pressure chambers 2—2. Each pressure chamber has associated therewith an inlet valve 5 connected to an exhaust valve 8 which cooperates with a valve control member 16 supported by diaphragm walls 10 and 13. A displaceable member 23 is supported by a diaphragm wall 19 and there are provided exhaust sections 11—11 and control sections 14—14 which latter are in communication with a common passage 15 adapted for communication with a control device. The members 23 are formed at their ends remote from the shoulders 24 with curved surfaces 35 which abut a lever 36 fulcrumed on a roller 37 adapted to be adjusted in a direction longitudinally of the lever so as to alter the fulcrum point of said lever. In operation when fluid pressure is introduced to the control sections 14, while the roller 37 is in its mid-position as shown, both valve control members 16 are displaced equal amounts to close the respective exhaust valves and open the respective inlet valves. When the pressures in the operating sections and control sections are equal the inlet valves are closed as is clearly shown in Figure 2 and the two brake mechanisms are exerting equal braking pressures on the respective wheels. To effect steering of the vehicle by differential braking of the wheels the roller 37 is moved by any convenient means to the appropriate side of the mid-position as shown in Figure 3 in which case the lever 36 is rocked about the roller an amount such that the appropriate exhaust valve is actuated to enable the pressure in the respective operating section to be lowered such as to counterbalance the other on the lever. By further altering the position of the roller the degree of differential braking of the wheels can again be adjusted to suit the necessary steering requirements.

The valve control member 16 is provided with a leg 20 formed at its end with a foot 21 which is disposed within a recess in the member 23. The recess is formed with inturned shoulders 24 which are adapted to cooperate with the foot 21 to provide a lost motion connection. The purpose of the lost motion is to permit the members 23 in the separate chambers to move in opposite directions for a limited distance before they need to engage with the members 16. For example the members 23 may move from the position shown in Fig. 2 to that shown in Fig. 3 so that one of them may apply an increased pressure without or before pressure is released from the opposite valve.

With reference to Fig. 4 the relay device comprises an inlet 3 communicating with duplicate pressure chambers 2—2. Each pressure chamber has associated therewith an inlet valve 5 connected to an exhaust valve 8 which co-operates with a valve control member 16 supported by diaphragm walls 10 and 13. A displaceable member 23 is supported by a diaphragm wall 19 and there are provided exhaust sections 11—11 and control sections 14—14 which latter are in communication with a common shuttle valve 25 (Fig. 4) having two supply ports 26 which communicate one with one control device and one with the other control device. The members 23 are formed at their ends remote from the shoulders 24 with curved surfaces 35 which abut a lever 36 fulcrumed on a roller 37 adapted to be adjusted by any convenient means in a direction longitudinally of the lever so as to alter the fulcrum point of said lever. When either control device is operated to apply the brakes the shuttle valve is actuated to open the respective port and close the opposite port so that fluid pressure passes into the control sections 14 and the differential braking pressures in the brake mechanisms are attained in like manner as described with reference to Figures 1, 2 and 3.

With reference to Figure 5 the shuttle valve 25 as shown in the previous figure is omitted. The diaphragm walls 19 constitute walls of second control sections 27 provided with passages 28 for connection to the second control device. The control section 27 is provided with a diaphragm wall 29 to which is secured a second displaceable member 30 formed with a recess 31 and inturned shoulders 32. The member 23 is formed with a leg 33 provided with a foot 34 which is disposed within the recess 31. The members 30 are formed at their ends remote from the shoulders 32 with curved surfaces 35 which abut a lever 36 fulcrumed on a roller 37 adapted to be adjusted by any convenient means in a direction longitudinally of the lever so as to alter the fulcrum point of said lever. In operation fluid pressure can be built up in the operating sections 7 by introducing fluid pressure by either of the passages 15 or 28 and the differential braking pressures in the brake mechanisms are attained in like manner as described with reference to Figures 1, 2 and 3.

Fluid pressure relay devices in which flexible diaphragms are used are satisfactory for relatively low pneumatic pressures.

In the previously described examples of fluid pressure relay devices which employ a fulcrum roller, said roller may be operated by a rod which, when the relay device is used in an aeroplane, may be connected to the rudder bar or linkage moving in relation to the rudder bar.

Having described my invention what I claim is:

1. A fluid pressure relay device for the control of two fluid pressure operated mechanisms which comprises a casing, two compartments within said casing in side by side relationship, a valve-controlled inlet passage at one end of each compartment, an axially movable valve-control member within each compartment adjacent the inlet end thereof, an exhaust passage in said member, an axially movable actuating member within each compartment coaxial with the valve-control member and having a lost-motion connection with said member, two fluid-tight connections between each valve-control member and the wall of its compartment and a fluid-tight connection between each actuating member and the wall of its compartment, said connections dividing each compartment into an operating chamber communicating with the valve-controlled inlet, an exhaust chamber communicating with the operating chamber through the exhaust passage and a control chamber, inlet and exhaust valves in each compartment co-operating with the inlet and exhaust passages respectively, said valves being actuated by axial displacement of the valve-control member, means for connecting each inlet valve to a source of pressure fluid, means for connecting each operating chamber to a fluid pressure operated mechanism, and means for connecting each control chamber to a source of pressure fluid, and a lever mechanism for adjusting relative axial movement of the two actuating members which comprises a lever in operative connection at each end with one of said actuating member, and a pivot for said lever displaceable to vary the relative distances of the pivot from the ends of the lever.

2. A relay device according to claim 1 wherein the fluid-tight connections are formed by flexible diaphragms.

3. A relay device according to claim 1 adapted for dual control wherein the means for connecting the control chamber to a source of pressure fluid comprises a shuttle valve.

4. A fluid pressure relay device for the dual control of two fluid pressure operated mechanisms which comprises a casing, two compartments within said casing in side by side relationship, a valve-controlled inlet passage at one end of each compartment, an axially movable valve-control member within each compartment adjacent the inlet end thereof, an exhaust passage in said member, an axially movable actuating member within each compartment coaxial with the valve-operating member and having a lost-motion connection with said member, a second coaxial axially slidable actuating member within each compartment having a lost-motion connection with the first actuating member, two fluid-tight connections between each valve-control member and the wall of its compartment and a fluid-tight connection between each actuating member and the wall of its compartment, said connections dividing each compartment into an operating chamber communicating with the valve-controlled inlet, an exhaust chamber communicating with the operating chamber through the exhaust passage and two control chambers, inlet and exhaust valves in each compartment co-operating with the inlet and exhaust passages respectively, said valves being actuated by axial displacement of the valve control member, means for connecting each inlet valve to a source of pressure fluid, means for connecting each operating chamber to a fluid pressure operated mechanism and means for connecting each control chamber to a source of pressure fluid; and a lever mechanism for adjusting relative axial movement of the valve control and actuating members which comprises a lever in operative connection at each end with the second actuating member of one of said valve control members, and a displaceable pivot for said lever.

HENRY WILLIAM TREVASKIS.

REFERENCES CITED

The following references are of record in the file of this patent:

UNITED STATES PATENTS

| Number | Name | Date |
| --- | --- | --- |
| 2,304,782 | Donaldson | Dec. 15, 1942 |
| 2,395,401 | Eaton | Feb. 26, 1946 |
| 2,406,284 | Fitch | Aug. 20, 1946 |
| 2,418,013 | Cook | Mar. 25, 1947 |
| 2,419,443 | Eaton | Apr. 22, 1947 |
| 2,491,812 | Hoffacker | Dec. 20, 1949 |

FOREIGN PATENTS

| Number | Country | Date |
| --- | --- | --- |
| 383,462 | Great Britain | Nov. 17, 1932 |